United States Patent [19]

Mumzhiu

[11] Patent Number: 4,470,662
[45] Date of Patent: Sep. 11, 1984

[54] ROTARY OPTIC SWITCH

[75] Inventor: Alexander M. Mumzhiu, Oak Park, Mich.

[73] Assignee: Mid-West Instrument, Troy, Mich.

[21] Appl. No.: 482,954

[22] Filed: Apr. 7, 1983

[51] Int. Cl.³ .................................................. G02B 5/14
[52] U.S. Cl. .................................. 350/96.15; 350/486
[58] Field of Search .............. 350/486, 96.2, 6.6, 350/6.9, 96.15, 6.4

[56] References Cited

U.S. PATENT DOCUMENTS

| | | |
|---|---|---|
| 2,182,717 | 12/1939 | Chance . |
| 2,361,973 | 11/1944 | Smith . |
| 2,447,344 | 8/1948 | Kliever . |
| 3,237,012 | 2/1966 | Treffeisen . |
| 3,290,593 | 12/1966 | Crowdes . |
| 3,351,767 | 11/1967 | Suiter . |
| 3,594,532 | 7/1971 | Lunau et al. ............... 350/486 X |
| 3,725,817 | 4/1973 | Nolan . |
| 3,940,609 | 2/1976 | Johnstun . |
| 4,214,154 | 7/1980 | Sato . |
| 4,239,331 | 12/1980 | Aoyama ....................... 350/96.2 |
| 4,279,507 | 7/1981 | Bulpitt . |
| 4,303,303 | 12/1981 | Aoyama . |
| 4,304,460 | 12/1981 | Tanaka et al. ............. 350/96.16 |
| 4,329,017 | 5/1982 | Kapany et al. . |
| 4,344,666 | 8/1982 | Bergmeir et al. . |
| 4,352,550 | 10/1982 | Uchida . |

FOREIGN PATENT DOCUMENTS 0007250  1/1978  Japan ........................................ 350/6.4

Primary Examiner—John K. Corbin
Assistant Examiner—Lynn Vandenburgh
Attorney, Agent, or Firm—Burton, Parker & Schramm

[57] ABSTRACT

A rotary optic switch for alternatively coupling a single light path to any one of a plurality of other light paths upon the relative rotation of a light deflecting means. A first deflecting means deflects light from a first radial path to an axial path. A rotatable second light deflecting means deflects light from the axial path parallel to the axis of rotation of the second light deflecting means to a second radial path which moves responsive to the rotation of the second deflecting means. Light is supplied to the first radial light path by a first optic element. A plurality of second optic elements are located circumaxially around the axis of rotation of the second light deflecting means and can be alternatively optically coupled to the first optic element by rotation of the second light deflecting means aligning the second radial light path with each of the second optic elements.

17 Claims, 3 Drawing Figures 4,470,662

ROTARY OPTIC SWITCH

DESCRIPTION

1. Field of Invention

This invention relates to optical switching devices, and more particularly to rotary optic switches used to couple optical fibers for the bidirectional transmission of optical signals.

2. Background of Invention

With the increased use of optic fibers, a need for a reliable, low-cost optical switch capable of alternatively coupling a single optic fiber to any one of a number of other optic fibers has developed. Prior art optic switches typically had a very limited number of switch positions, as shown in the two-position switch of U.S. Pat. Nos. 4,223,217 and 4,239,331, or required complex and expensive optical elements and precise alignment of the components as in U.S. Pat. No. 4,304,460.

SUMMARY OF THE INVENTION

I have devised a rotary optic switch which allows a first optic fiber to be alternatively optically coupled to any one of a plurality of second optic fibers arranged about the axis of rotation. Light from the end of the first optic fiber is collimated into a path extending radially of the axis of rotation. Light from the first radial path is deflected into a path parallel to the axis of rotation by a first light deflecting means. Such axial light path extends between the first light deflecting means and a second light deflecting means which deflects the light into a second radial light path. Such second radial light path is alternatively coupled to the second optic fibers by the rotation of the second light deflecting means and the second radial path relative to the second optic fibers. As the second radial light path is aligned with each of the second optic fibers, the second optic fiber becomes coupled to the first optic fiber for the bidirectional transmission of optic signals. A lens is positioned adjacent end of the second optic fibers to focus the light from the second radial path upon the optic fiber and to collimate the light emitted by the optic fiber into the second radial path.

The term "light" is used in the specification and claims in a generalized sense, and is not limited merely to the visible spectrum. The term "light" is defind as electromagnetic radiation of all frequencies including but not limited to the infrared, visible, and ultraviolet ranges which can be generated by any number of means, such as an incandescent light bulb, a light-emitting diode or a laser.

BRIEF DESCRIPTION OF PREFERRED EMBODIMENT

Figure 1:
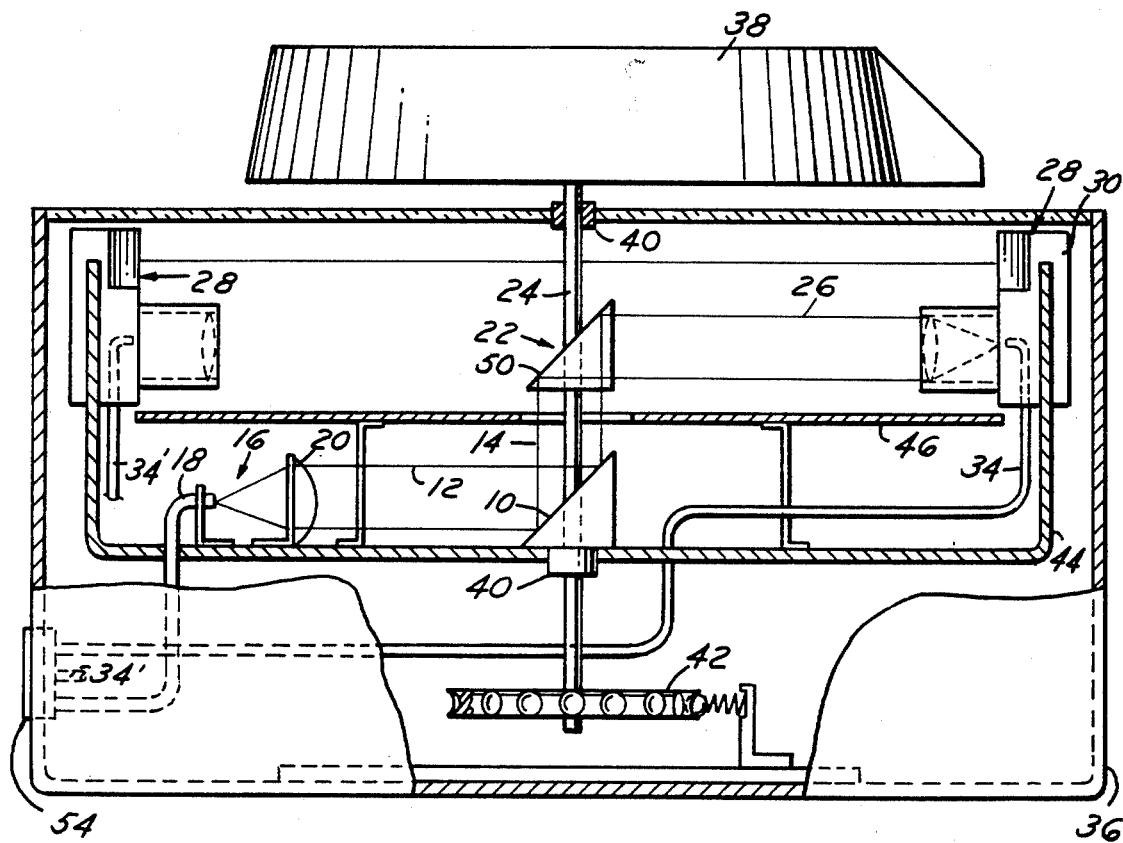
FIG. 1 is a cross-sectional side view of the rotary optic switch.
Figure 2:
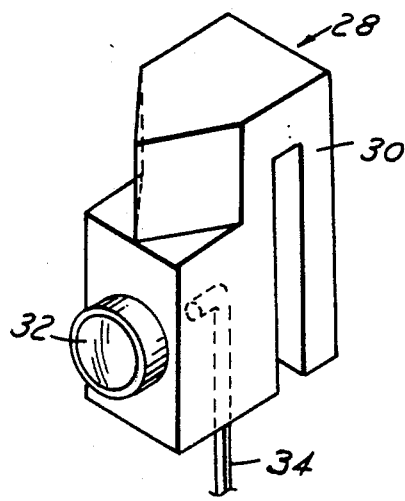
FIG. 2 is an objective view of a second optic element.

Referring to the drawings, the rotary optic switch has four main components: a first light deflecting means; a second light deflecting means; a first optic element; and a second optic element. The first means for deflecting light employed in the embodiment in FIG. 1 is an inclined mirror 10 which deflects light between the first radial light path 12 and the axial light path 14. The first radial light path 12 extends between the first optic element 16 and mirror 10. The first optic element 16 comprises a first optic fiber 18 and a lens 20 which collimates the light emitted by the optic fiber into the first radial light path 12. The lens 20 will, alternatively, focus the light traveling in the opposite direction along the first radial light path 12 onto the end of first optic fiber 18. Axial light path 14 extends between mirror 10 and the second means for deflecting light which is comprised of a prism 22 in the preferred embodiment shown in FIGS. 1 and 3. Prism 22 is affixed to shaft 24 for rotation therewith. Prism 22 deflects light from the axial path 14, which is parallel to shaft 24, to a radial light path 26, herein referred to as the second radial light path. A plurality of second optic elements 28 are spaced circumaxially about shaft 24 so that the second radial light path 26 may be alternatively aligned with each of the optic elements 28 as shaft 24 and prism 22 are rotated. Each of the second optic elements 28 as shown in FIGS. 1 and 2 comprises housing 30 supporting lens 32, which focuses light from the second radial path 26 onto the end of a second optic fiber 34. The first optic fiber 18 can be thereby optically coupled to any one of the second optic fibers 34 by rotation of shaft 12 aligning the second radial light path with each of the second optic elements 28. As shaft 24 and the second radial light path 26 rotate, prism 22 remains optically coupled to the axial light path 14, which in turn is optically coupled to the first radial light path 12. As in the case of lens 20, lens 32 can also collimate light from the end of optical fiber 34 into path 26 should such be desired.

As shown in the preferred embodiment in FIG. 1, the rotary optic switch is generally enclosed by housing 36. Knob 38 is affixed to one end of shaft 24 to facilitate manual rotation of the shaft 24 and prism 22. While only knob 38 is shown in the drawings for rotation of the shaft, an electric motor or other means can be employed to rotate the shaft from a remote control. Shaft 24 is supported on bearings 40, and extends through prism 22 and mirror 10, insuring positive alignment of these two light deflecting means in the axial path. A mechanical detent 42 is shown affixed to the opposite end of shaft 24 to provide a means for holding the prism in proper orientation with each of the second optic elements 28. Second optic elements 28 are adjustably slidably mounted on support 44. Optic fibers 34 are held in place by baffle 46 to insure that they do not interfere with second radial light path 26.

Figure 3:
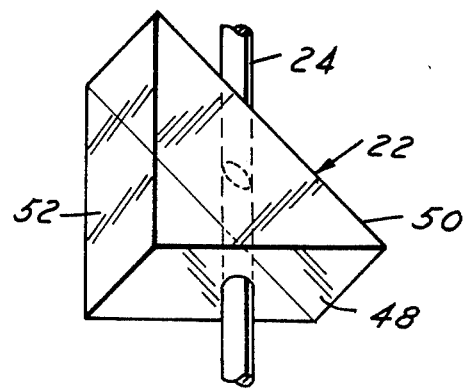
FIG. 3 is an objective view of the rotary second means for deflecting light affixed to the shaft.

FIG. 3 is an enlarged view of prism 22 which serves as a rotatable means for deflecting light. This prism is a right-triangular shaped element having three facets: facet 48 which is perpendicular to the shaft 24 is in the axial light path 14, facet 50 which is inclined at 45° serves as a reflective surface, and facet 52 which is parallel to the shaft, is in the second radial light path 26. While these three facets are shown as planar surfaces, a lens could be formed in any one of these facets to provide a means for focusing the light in the second radial light path 26, causing it to converge upon first optic element 28. Furthermore, while FIGS. 1 and 3 show facet 50 inclined at 45° resulting in a radial path 16 being substantially perpendicular to the shaft, facet 50 could alternatively be inclined at more or less than 45°, causing light path 26 to extend radially at an angle other than 90° from shaft 24. While FIGS. 1 and 3 show a rotatable light deflecting means as a right-triangular prism 22, other shaped prisms may be used or a reflective mirror surface could alternatively be used as a light deflecting means. The first radial light path 12 may also be at an angle other than 90° with respect to shaft 24.

Fiber optic connector 54 is shown in the housing 30 to provide a convenient method of attaching the invention to a multi-fiber cable. A number of connectors of this type are commercially available and are designed so that connector elements will only mate in a single orientation. The cable may be then connected to a remote source of light and light sensing means. This invention may be also used to provide a switching function in explosive environments where an electrical device would be a safety hazard. The fiber optic cable could be connected to an electrical device outside the explosive area.

I claim:

1. An optic switch comprising:
  a first means for deflecting light from a first radial path to an axial path;
  a rotatable second means for deflecting light traveling along said axial path into a second radial light path, so that the light from the first and second radial paths are optically coupled, with the second radial light path moving in response to the rotation of said rotatable second deflecting means;
  a first optic element for optic coupling with the first radial light path; and
  a second optic element arranged in relation to said second deflecting means for relative rotation therebetween and optic coupling with said second radial light path for transmission of optical signals between the first and second optic elements.

2. The optic switch of claim 1 wherein the second means for deflecting light is rotatable about an axis which is parallel to the axial light path.

3. The optic switch of claim 2 wherein at least one of the first and second radial paths are substantially perpendicular to the axis of the shaft.

4. The optic switch of claim 2 wherein both the first and second radial paths are substantially perpendicular to the axis of the shaft.

5. The optic switch of claim 4 wherein the second means for deflecting light is comprised of a prism.

6. The optic switch of claim 5 wherein the prism is in the shape of a right triangle, one facet of which is perpendicular to the axial light path and another facet perpendicular to the first radial light path.

7. The optic switch of claim 5 wherein the second means for deflecting light is comprised of a mirror.

8. The optic switch of claim 4 wherein said second optic element comprises a lens and an optic fiber aligned in the second radial light path with the lens focused in the end of the optic fiber.

9. The optic switch of claim 8 wherein the first optic element comprises a lens and an optic fiber aligned in the first radial light path with the lens focused on the end of the optic fiber.

10. The optic switch of claim 8 wherein the second means for deflecting light comprises a prism.

11. The optic switch of claim 10 wherein the prism has a lens formed in one facet to focus light upon the first optic element.

12. The optic switch of claim 1 characterized by a rotatable shaft carrying the second light deflecting means, the shaft extending through and rotatable relative to the first light deflecting means, whereby the light traveling between said deflecting means travels in a column coaxial with said shaft.

13. The optic switch of claim 12 wherein there is a plurality of first optic elements each of which may be independently coupled to the second optic element by rotation of the second means for deflecting light aligning the second radial path therewith.

14. The optic switch of claim 13 further comprising detent means for holding the shaft, alternatively maintaining each of the second optic elements aligned in the second radial light path.

15. The optic switch of claim 13 further comprised of means for rotating the shaft.

16. The optic switch of claim 15 wherein the means for rotating the shaft comprises an electric motor.

17. An optic switch comprising:
  a mirror for deflecting light from a first radial light path into an axial path;
  a rotatable prism for deflecting light traveling along said axial path which is parallel to the axis of rotation of the prism into a second radial path which moves responsive to rotation of said prism so that the light from the first radial path is optically coupled to the second radial path;
  a first optic element in the first radial light path optically coupled to the mirror for transmission of optical signals, said first optic element comprising a lens and an optic fiber aligned in the first radial light path with the lens focused on the end of the optic fiber;
  a plurality of second optic elements for alternative optic coupling to the prism when the prism is oriented to align the second radial light path with the second optic element, each of said second optic elements comprising a lens and an optical fiber with the lens focused in the range to receive light from the second radial light path;
  a shaft carrying the prism for rotation therewith and extending through and rotatable relative to the mirror, whereby the light traveling along the axial path between the mirror and the prism is in a column parallel to said shaft;
  means for holding the shaft to alternatively maintain the second radial light path aligned with a second optic element; and
  means for rotating the shaft.

* * * * *

UNITED STATES PATENT OFFICE
CERTIFICATE OF CORRECTION

Patent No. 4,470,662  Dated September 11, 1984

Inventor(s) ALEXANDER M. MUMZHIU

It is certified that error appears in the above-identified patent and that said Letters Patent are hereby corrected as shown below:

In Claim 8, column 3, line 55, delete the second word "in" and insert --- on --- , so that the claim will read:

8. The optic switch of claim 4 wherein said second optic element comprises a lens and an optic fiber aligned in the second radial light path with the lens focused on the end of the optic fiber.

Signed and Sealed this

Twenty-sixth Day of February 1985

[SEAL]

*Attest:*

DONALD J. QUIGG

*Attesting Officer*  *Acting Commissioner of Patents and Trademarks*